(12) United States Patent
Hayashi

(10) Patent No.: US 6,545,965 B1
(45) Date of Patent: Apr. 8, 2003

(54) RECORDING MEDIUM HAVING ADJACENT PIT TRAINS IN OPPOSITE PHASE, RECORDING APPARATUS FOR THE SAME, AND REPRODUCING APPARATUS FOR THE SAME

(75) Inventor: Hideki Hayashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/482,918

(22) Filed: Jan. 14, 2000

(30) Foreign Application Priority Data

Jan. 14, 1999 (JP) .......................................... 11-007891

(51) Int. Cl.[7] .............................................. G11B 5/09
(52) U.S. Cl. .................................................. 369/59.12
(58) Field of Search ................ 369/59.12, 59.22–59.24, 369/275.4, 124.02

(56) References Cited

U.S. PATENT DOCUMENTS

| | | | | |
|---|---|---|---|---|
| 5,095,392 A | * | 3/1992 | Shimazaki et al. | ............ 360/40 |
| 5,506,827 A | * | 4/1996 | Tobita | .......................... 369/59 |
| 5,818,805 A | * | 10/1998 | Kobayashi et al. | ............ 369/59 |
| 5,864,525 A | * | 1/1999 | Takeshita et al. | ......... 369/44.23 |
| 6,038,209 A | * | 3/2000 | Satoh | ....................... 369/275.3 |
| 6,091,701 A | * | 7/2000 | Koboyashi | ............... 369/275.4 |

FOREIGN PATENT DOCUMENTS

JP 6-76303 3/1994

OTHER PUBLICATIONS

Hideki Hayashi et al., "Simulation of a High Density Optical Disc System Employing Multi–Level Pit Edge Recording and 2 Dimensional PRML Reproduction", Technical Report of IEICE, 1998, pps. 7–13 (This is a Japanese Publication with an English Abstract).

Seiji Kobayashi et al., "Partial Response Recording in Radial Direction", Optical Data Storage Conference Digest, Apr. 7–9, 1997, pps. 42–43.

* cited by examiner

Primary Examiner—Doris H. To
Assistant Examiner—Gautam R. Patel
(74) Attorney, Agent, or Firm—Morgan, Lewis & Bockius LLP

(57) ABSTRACT

A recording medium for recording digital information including a substrate member, a plurality of recording tracks formed on the substrate member, and a plurality of pits formed on the recording tracks. In the recording medium, the pits are arranged in a fixed period, the position of an edge of each pit is changed in accordance with the digital information to be recorded in the recording medium, and the phase of the train of the pits formed on one of the recording tracks and the phase of the train of the pits formed on another one of the recording tracks adjacent to the one of the recording tracks are shifted each other by half of the fixed period.

9 Claims, 12 Drawing Sheets

FIG. 3B

| RECORDING DATA | | RECORDING SYMBOL |
|---|---|---|
| DECIMAL | BINARY | |
| 0 | 000 | -1  -1 |
| 1 | 001 | -1  0 |
| 2 | 010 | -1  1 |
| 3 | 011 | 0  -1 |
| 4 | 100 | 0  1 |
| 5 | 101 | 1  -1 |
| 6 | 110 | 1  0 |
| 7 | 111 | 1  1 |

$E_0 \sim E_8$ : PREDICTION VALUES

US 6,545,965 B1

RECORDING MEDIUM HAVING ADJACENT PIT TRAINS IN OPPOSITE PHASE, RECORDING APPARATUS FOR THE SAME, AND REPRODUCING APPARATUS FOR THE SAME

BACKGROUND OF THE INVENTION

1. Field of the Invention

The present invention relates to a recording medium such as an optical disk for recording digital data as pits in high density, a recording apparatus for recording digital data on the recording medium, and a reproduction apparatus for reproducing the digital data recorded in the recording medium.

2. Description of the Related Art

A SCIPER (Single Carrier Independent Pit Edge Recording) system is known as a method for recording digital data in a recording medium such as an optical disk in high density.

In the SCIPER system, pits are arranged at a predetermined interval along the circumferential direction on the tracks of an optical disk, and the positions of the front edge and the rear edge of each pit are changed stepwise, respectively, in accordance with the digital data to be recorded. Namely, in the SCIPER system, the position of the pit itself is not changed but the positions of the front edge and the rear edge of the pit are changed, respectively, for recording digital data on the tracks. The front edge indicates the edge located at the front portion of the pit, and the front portion of the pit indicates the portion located in one of the circumferential directions of the optical disk. The rear edge indicates the edge located at the rear portion of the pit, and the rear portion of the pit indicates the portion located in the other circumferential direction of the optical disk.

FIG. 7 shows pits formed on an optical disk according to the SCIPER system. In FIG. 7, assume that the beam spot moves in the direction indicated by arrow a on the optical disk. The positions designated by reference numerals FE1 to FE3 in the pit PT constitute the front edge, and the positions indicated by reference numerals RE1 to RE3 constitute the rear edge. In FIG. 7, solid lines indicate the contour of the pits PT which are actually formed on the optical disk, and dotted lines indicate the other contour of the pits which are formed when the other recording symbols are assigned to these pits.

The pits PT shown in FIG. 7 are arranged at a predetermined interval D3. The front edge of each pit PT represents a recording symbol having one of ternary levels of "−1", "0" and "+1" by changing the position thereof in three steps. The rear edge of each pit PT also represents a recording symbol having one of ternary levels of "−1", "0" and "+1" by changing the position thereof in three steps.

When the recording symbol is "−1", for example, the front edge takes a position indicated by reference numeral FE3 and thereby the length of the pit PT is shortened. When the recording symbol is "0", on the other hand, the front edge takes a position indicated by reference numeral FE2, which is an intermediate position of the three positions. When the recording symbols is "+1", the front edge takes a position indicated by reference numeral FE1 and thereby the length of the pit PT is lengthened.

In similar fashion, when the recording symbol is "−1", the rear edge takes a position indicated by reference numeral RE1 and thereby the length of the pit PT is shortened. When the recording symbol is "0", the rear edge takes a position indicated by reference numeral RE2, which is an intermediate position of the three positions. When the recording symbol is "+1", the rear edge takes a position indicated by reference numeral RE3 and thereby the length of the pit PT is lengthened.

When reproducing the digital data from an optical disk, the reproduction apparatus radiates a reproducing laser beam toward the optical disk thereby to form a beam spot SP on the pits PT as shown in FIG. 7. At the same time, the reproduction apparatus moves the beam spot SP in the direction of arrow a in FIG. 7. In this way, the reproduction apparatus detects an analog detection signal corresponding to the recording symbol recorded as a position of the front edge or the rear edge. As a result, the level of the analog detection signal is changed in three steps in accordance with the levels "−1", "0" and "+1" of the recording symbol corresponding to the position of the front edge or the rear edge. The reproduction apparatus performs the filter operation for emphasizing the high frequency band of the analog detection signal, detects the levels of the three steps and reproduces the digital data.

Next, the level detection of the analog detection signal will be explained with reference to FIG. 8. FIG. 8 is a diagram showing waveforms of the analog detection signal. In FIG. 8, a multiplicity of signals that can be output as an analog detection signal are shown in overlapped form.

The reproduction apparatus sample-holds the analog detection signal at the timing indicated by T1, T2, T3 and T4 in FIG. 8. The reproduction apparatus then compares the level obtained by sample-holding with preset threshold values, and determines which of "−1", "0" and "+1" is indicated by the level.

The reproduction apparatus compares the level obtained by sample-holding with two threshold values "−0.5" and "+0.5". If the level obtained by sample-holding is smaller than −0.5, the reproduction apparatus determines that the particular level represents "−1". If the level obtained by sample-holding is not smaller than −0.5 but not larger than 0.5, the reproduction apparatus determines that the particular level represents "0". If the level obtained by sample-holding is larger than +0.5, the reproduction apparatus determines that the level is "+1".

The technique of the SCIPER system is described, for example, in Japanese Laid-open Publication No. Hei 6-76303.

On the other hand, a research is under way for the technique to make possible the recording and reproducing operation of higher density by combining the SCIPER system with the conventional RPR (Radial Direction Partial Response) system. The recording and reproducing operation by a combination of the SCIPER system and the RPR reproduction system is described, for example, in "Partial Response Recording in Radial Direction", 1997 Optical Data Storage Conference Digest, pp. 42–43, (Apr. 1997).

Next, a pit arrangement of the optical disk and the reproduction of the digital data from the optical disk by the recording and reproduction technique of the combined SCIPER system and the RPR reproduction system will be explained with reference to FIGS. 9A and 9B. FIG. 9A is a plan view showing a pit arrangement of the optical disk according to the conventional recording and reproduction technique using the combined system of SCIPER and RPR, and FIG. 9B is a diagram showing waveforms of the analog detection signal. In FIG. 9B, a multiplicity of signals that can be output as an analog detection signal are all shown in overlapped form. However, only one of the multiplicity of waveforms shown in FIG. 9B is output as the analog detection signal. Further, the description below refers to the case in which the positions of the front and rear edges of each pit correspond to the recording symbols having one of ternary levels of "−1", "0" and "+1". Also, in order to indicate that the positions of the front and rear edges of each pit are changed in three steps in accordance with the recording symbol, all the three positions that each edge can take are indicated by solid lines in FIG. 9A. The actual edge position of course is one of the three positions. This is also the case with FIG. 10A described later.

In the case where digital data are reproduced by the recording and reproduction technique combining the SCIPER system and the RPR reproduction system, the beam spot is arranged with the center thereof coincident with the center line CL1 between adjacent two tracks T, and moved along this center line CL1. Thus, adjacent two tracks T are radiated at the same time by the laser beam.

Further, in the recording and reproduction technique combining the SCIPER system and the RPR reproduction system, the pit trains are in phase with each other between adjacent tracks T. Namely, the pits PT are arranged radially of the optical disk, a pit PT on one track T adjoins another pit on another track T, and one land LD adjoins another land LD, as shown in FIG. 9A. The land LD indicates an area between two adjacent pits PT in the circumferential direction, i.e. the area where no pit PT is formed.

Further, when reproducing the digital data by the recording and reproduction technique combining the SCIPER system and RPR reproduction system described above, the reproduction apparatus sample-holds the level of the analog detection signals detected at the timing when the front edges of the radially adjacent two pits PT are irradiated at the same time or the timing when the rear edges of the same two pits are irradiated at the same time.

Assume that the level of the analog detection signal decreases when the beam spot SP is located on pits. ST1 and ST2 in FIG. 9B indicate the time points when the beam spot comes to the positions SP1 and SP2 in FIG. 9A respectively. At these time points, the reproduction apparatus sample-holds the levels of the analog detection signal.

In the example shown in FIGS. 9A and 9B, the pits PT formed on the two tracks T are detected at the same time, and each PT has an edge at the position changed in accordance with the recording symbol having one of the ternary levels "−1", "0" and "+1". The level obtained by sample-holding the analog detection signal, therefore, indicates one of the sums of two recording symbols. Namely, the level obtained by sample-holding indicates one of the five levels "−2", "1", "0", "+1", "+2". The reproduction apparatus compares the level obtained by sample-holding with predetermined threshold values and thus specifies one of the five values thereby to reproduce the digital data.

Further, as shown in FIG. 9B, the analog detection signal alternates between rise and fall at each sample timing. This is because the pit trains are in phase with each other between adjacent tracks T.

Namely, during the period when the front edge of the pit PT is included in the beam spot, the area of the pit PT included in the beam spot increases and therefore the amount of light reflected from the optical disk decreases with time. During the period when the rear edge of the pit PT is included in the beam spot, on the other hand, the area of the pit PT included in the beam spot decreases and therefore the amount of light reflected from the optical disk increases with time. As a result, the waveform of the detection signal is inclined at each sample timing.

On the other hand, a research is under way on the technique of combining the SCIPER system with what is called the two-dimensional PRML (Partial Response Maximum Likelihood) according to the prior art. The recording and reproduction technique based on the combination of the SCIPER system and the two-dimensional PRML reproduction system is described, for example, in "Simulation of a High Density Optical Disk System Employing Multi-Level Pit Edge Recording and 2 Dimensional PRML Reproduction", Oct. 1998, Research Report MR98-30, Magnetic Recording Research Committee, the Institute of Electronics, Information and Communication Engineers.

Next, the pit arrangement of an optical disk and the reproduction of digital data from the optical disk by the recording and reproduction technique using the combination of the SCIPER system and the two-dimensional PRML reproduction system will be explained with reference to FIGS. 10A and 10B. FIG. 10A is a plan view showing the pit arrangement of the optical disk according to the conventional recording and reproduction technique using a combination of the SCIPER system and the two-dimensional PRML reproduction system, and FIG. 10B is a diagram showing waveforms of the analog detection signal. A multiplicity of signals likely to be output as detection signals are shown in overlapped form in FIG. 10B. Further, the description below refers to the case in which the positions of the front and rear edges of each pit correspond to the recording symbols having one of the ternary levels "−1", "0", "+1".

When the digital data are reproduced by the recording and reproduction technique combining the SCIPER system and the two-dimensional PRML reproduction system, the beam spot is arranged with the center thereof coincident with the center line CL2 between adjacent two tracks T and moves along the center line CL2. The adjacent two tracks T are irradiated at the same time by the laser beam.

Further, in the recording and reproduction technique combining the SCIPER system and the two-dimensional PRML reproduction system, like the recording and reproduction technique combining the SCIPER system and the RPR reproduction system, the pit trains are in phase with each other between adjacent tracks T.

Furthermore, when reproducing digital data by the recording and reproduction technique combining the SCIPER system and the two-dimensional PRML reproduction system, the reproduction apparatus sample-holds the levels of the analog detection signal detected (i) at a timing when the front edge and the rear edge of two radially adjacent pits PT, respectively, are irradiated at the same time, or (ii) at a timing when the rear edges of adjacent two pits in the radial direction and the front edges of adjacent two pits PT in the circumferential direction are irradiated at the same time.

Assume that the level of the analog detection signal decreases when the beam spot SP is located on pits. ST3 and ST4 in FIG. 10B indicate the time points when the beam spot comes to the positions SP3 and SP4 in FIG. 10A respectively. At these time points, the reproduction apparatus sample-holds the levels of the analog detection signal.

In the example shown in FIGS. 10A and 10B, a total of four edges of the pits PT formed on the two tracks T are detected at the same time, and each edge of the pits changes its position in accordance with the recording symbol having one of the ternary levels "−1", "0", "+1". As a result, the level obtained by sample-holding the analog detection signal indicates one of the sums of the four recording symbols.

Namely, the level obtained by sample-holding indicates one of the nine values "−4" to "+4". The reproduction apparatus compares the level obtained by sample-holding with predetermined threshold values and by thus specifying one of the nine values, reproduces the digital data.

Further, as shown in FIG. 10B, the level of the analog detection signal varies at each sample timing. This is because pit trains are in phase with each other between adjacent tracks T, as described above.

Namely, when the beam spot is located at the position indicated by SP3 in FIG. 10A, the pits PT occupy considerable area in the beam spot range, and therefore the amount of the light reflected from the optical disk is small. When the beam spot is located at the position indicated by SP4 in FIG. 10A, on the other hand, the pits PT occupy small area in the beam spot range, and therefore the amount of the light reflected from the optical disk is considerable. As a result, the level of the detection signal is varied from one sample timing to another.

As mentioned earlier, in the recording and reproduction technique combining the SCIPER system and the RPR reproduction system described with reference to FIG. 9, the pit trains are in phase with each other between adjacent tracks T. Therefore, the waveform of the reproduction signal is inclined at each sample timing. Further, in the case where the reproduction clock contains a timing offset or a jitter, the level of the sample value obtained by sampling considerably fluctuates so that accurate data reproduction is difficult by the comparison with the threshold values (indicated by the lateral dashed lines in FIG. 9B), resulting in a deteriorated reproduction performance.

Also in the recording and reproduction technique combining the SCIPER system and the two-dimensional PRML reproduction system described with reference to FIGS. 10A and 10B, the pit trains are in phase with each other between adjacent tracks T. Therefore, the center level of the detection signal is varied from one sample timing to another. As a result, in the case where the digital data are decoded by the Viterbi decoding method from the sample values, for example, two groups of nine prediction values (first prediction value group and second prediction value group in FIG. 10B) should be provided to meet the variations of the center level, which groups are required to be switched alternately at each sample timing. This leads to the problem of a complicated information reproduction apparatus. Namely, in FIG. 10B, when the overall level of the first prediction value group used at the timing ST3 is compared with the overall level of the second prediction value group used at the timing ST4, it is seen that the level of the second prediction value group is higher than that of the first prediction value group.

As generally known as Hopkins' optical theorem, on the other hand, the amount of the light reflected from embossed pits is not proportional to the pit area and is a nonlinear response. Thus, in the recording and reproduction technique combining the SCIPER system and the two-dimensional PRML reproduction system, the detection signal fails to take a simple level representing the sum of four data (nine levels "−4" to "4" in the case of FIG. 10B) but shows a nonlinear level distribution. This nonlinear distortion of the detection signal becomes more conspicuous with the change of the pit area in the beam spot SP. In the conventional combination of the SCIPER system and the two-dimensional PRML reproduction system, the pit area in the beam spot SP considerably varies with each sample timing, resulting in a large nonlinear distortion of the detection signal. Thus, the dispersion is increased in the level distribution of the sample values, thereby leading to the problem that accurate data reproduction becomes more difficult and the reproduction performance is deteriorated.

SUMMARY OF THE INVENTION

An object of the present invention is to provide a recording medium, a recording apparatus and a reproduction apparatus capable of preventing the deterioration of the reproduction performance without complicating the configuration of the information reproduction apparatus even in the case where a high-density recording and reproduction operation is performed using the various recording and reproduction techniques described above.

A recording medium in accordance with the present invention includes a substrate member, a plurality of recording tracks formed on the substrate member, and a plurality of pits formed on the recording tracks. In the recording medium, digital information is recorded as pits. The pits are arranged in a fixed period. The position of an edge of each of the pits is changed in accordance with the digital information. The phase of the train of the pits formed on one of the recording tracks and the phase of the train of the pits formed on another one of the recording tracks adjacent to the one of the recording tracks are shifted each other by half of the fixed period.

When the digital information is reproduced from the recording medium according to the RPR system, PRML system or the like, at least two recording tracks adjacent to each other are simultaneously irradiated with a light beam, and the positions of the edges of at least two pits formed on the two recording tracks are simultaneously detected. The detection of the pits is achieved by receiving the light beam reflected by the recording tracks and generating a detection signal representing, for example, the amount of the reflected light. If the ratio of the total areas of the pits to the whole area that is irradiated with the light beam is changed, the amount of the reflected light is changed. Therefore, the level of the detection signal is also changed.

In the aforementioned conventional recording medium, the phase of the train of the pits formed on the recording track is identical with the phase of the train of the pits formed on the adjacent recording track. Because of this, the ratio of the total areas of the pits to the whole areas that is irradiated with the light beam is greatly changed with the movement of the detecting position (the position of the light spot of the light beam).

In the recording medium in accordance with the present invention, on the other hand, the phase of the train of the pits formed on the recording track and the phase of the train of the pits formed on the adjacent recording track are shifted each other by half of the fixed period. Therefore, the change of the ratio of the total areas of the pits to the whole areas that is irradiated with the light beam, with the movement of the detecting position, can be reduced. As a result, the center level of the detection signal can be made substantially constant. Thus, the determination of the edge positions of the pits can be made easier and more accurate, and the performance of the reproduction of the digital information can be improved.

In the recording medium, a disk may be used as the substrate member. In this case, the recording tracks are extended in the circumferential direction of the disk, and the position of the edge of each of the pits is changed in the circumferential direction of the disk.

In the recording medium, the position of the edge of each of the pits may be changed in three steps in accordance with the digital information.

In the recording medium, a digital information recording area and a control information recording area may be formed on the substance member. In this case, the pits corresponding to the digital information are recorded in the digital information recording area, and a plurality of control pits corresponding to control information are recorded in the control information recording area. The control information is information for a detection of the position of the edge of each of the pits corresponding to the digital information.

An information reproducing apparatus in accordance with the present invention is an apparatus for reproducing digital information recorded in the recording medium in which the phase of the train of the pits formed on a certain recording track and the phase of the train of the pits formed on the adjacent recording track are shifted each other as mentioned above. The information reproducing apparatus includes: a detecting device that simultaneously irradiates at least two of the recording tracks adjacent to each other with a light beam, simultaneously detects the positions of the edges of at least two of the pits formed on the at least two of the recording tracks, based on the light beam reflected by the at least two of the recording tracks, and generates a detection signal indicating the detected positions of the edges; and a reproducing device that reproduces digital information, based on the detection signal. In reproducing the digital information, the center level of the detection signal can be made substantially constant. Thus, the determination of the edge positions of the pits can be made easier and more accurate, and the performance of the reproduction of the digital information can be improved without complicating the structure of the information reproducing apparatus.

In the information reproducing apparatus, the reproducing device may include a Viterbi decoding device that decodes the detection signal in accordance with a Viterbi decoding method. By using the Viterbi decoding method, the accuracy of the reproduction of the digital information can be improved.

An information recording apparatus in accordance with the present invention is an apparatus for recording digital information in a recording medium in which the phase of the train of the pits formed on a certain recording track and the phase of the train of the pits formed on the adjacent recording track are shifted each other as mentioned above.

The information recording apparatus includes: a first generating device that generates a first pulse signal having a fixed period, whose rising timing and falling timing are changed in accordance with the digital information; a second generating device that generates a second pulse signal having the fixed period, whose rising timing and falling timing are changed in accordance with the digital information, and whose phase is shifted by 180 degrees from a phase of the first pulse signal; and a pit forming device that forms a plurality of pits on the recording tracks by using the first pulse signal and the second pulse signal, thereby recording the digital information on the recording tracks as the pits. The pit forming device forms a first part of the pits on one of the recording tracks such that positions of edges of each of the pits in the first part are changed in accordance with the rising timing and the falling timing of the first pulse signal. The pit forming device forms a second part of the pits on another one of the recording tracks adjacent to the one of the recording tracks such that positions of edges of each of the pits in the second part are changed in accordance with the rising timing and the falling timing of the second pulse signal.

Since the first pulse signal is 180 degrees out of phase with the second pulse signal, the phase of the pit train formed by using the first pulse and the phase of the pit train formed by using the second pulse are shifted each other by 180 degrees. The pit forming device alternately uses the first pulse signal and the second pulse signal, and switches them over each time the formation of the pits on one recording track is finished. As a result, the phase of the pit train on the recording medium is reversed for each recording track.

If the substrate member of the recording medium is a disk and the recording tracks are extended in a circumferential direction of the disk, then the pit forming device forms the pits such that the positions of the edges of each of the pits are changed in the circumferential direction of the disk.

In the information recording apparatus, the pit forming device may form the pits such that the positions of the edges of each of the pits are changed in three steps in accordance with the digital information.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3B is a diagram showing a conversion table for converting digital data into recording symbols;

DETAILED DESCRIPTION OF THE PREFERRED EMBODIMENTS

Embodiments of the invention will be explained with reference to the drawings. In the embodiments described below, the positions where the front edge and the rear edge of each pit are formed correspond to the recording symbols having one of the ternary values "−1", "0", "+1".

(I) First Embodiment

A first embodiment of the invention will be explained with reference to FIGS. 1 to 5.

The first embodiment described below is an application of the invention to the recording/reproduction operation by a combination of the SCIPER system and the two-dimensional PRML reproduction system.

(A) Recording medium

An optical disk (read-only optical disk) constituting a recording medium according to the first embodiment will be explained with reference to FIGS. 1 and 2. The optical disk has a substrate member 50. A data area (or a digital information recording area) having pits taking charge of the digital data to be actually recorded and what is called a sample servo area (or a control information recording area) having pits for reproduction control are formed on the substrate member 50.

Figure 1:
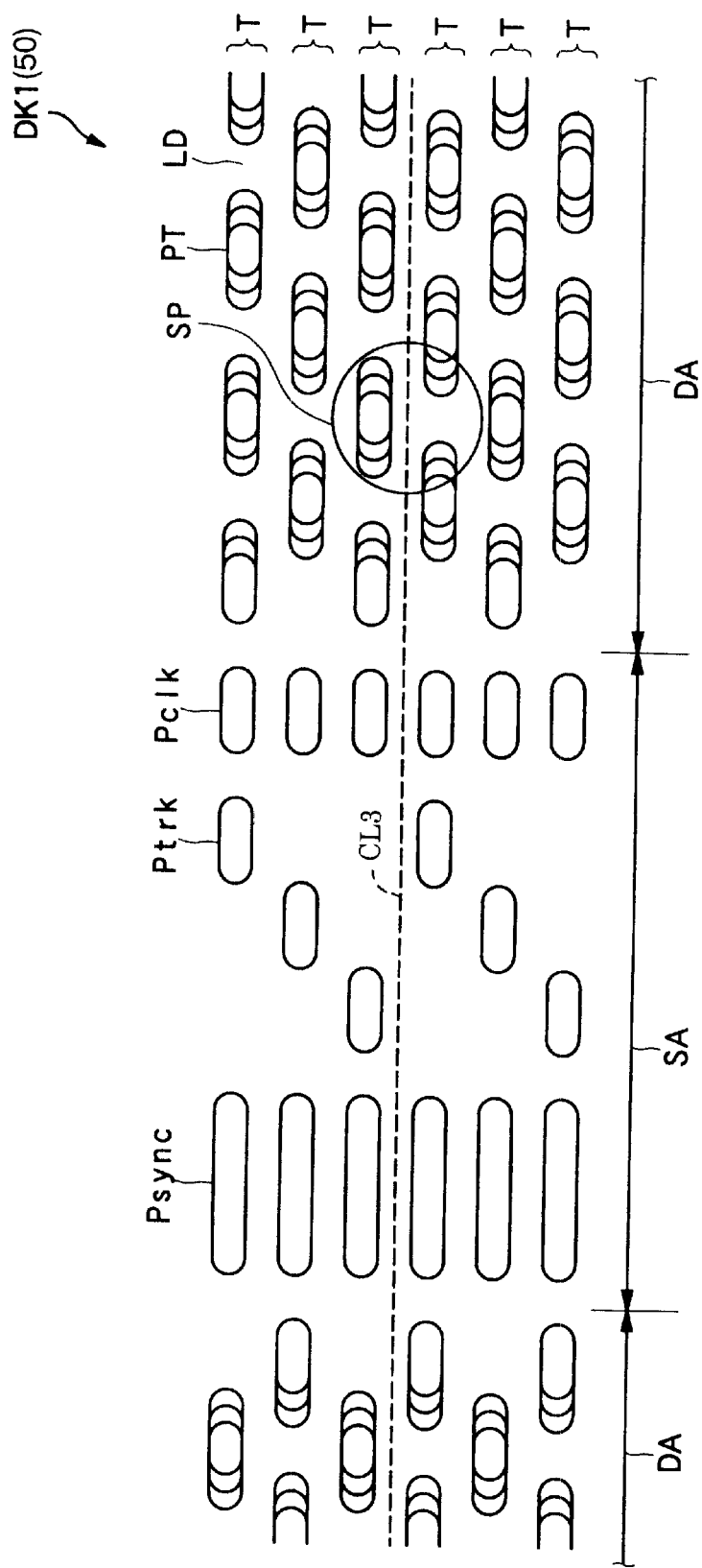
FIG. 1 is a plan view showing a configuration of an optical disk according to a first embodiment of the present invention.
Figure 2:
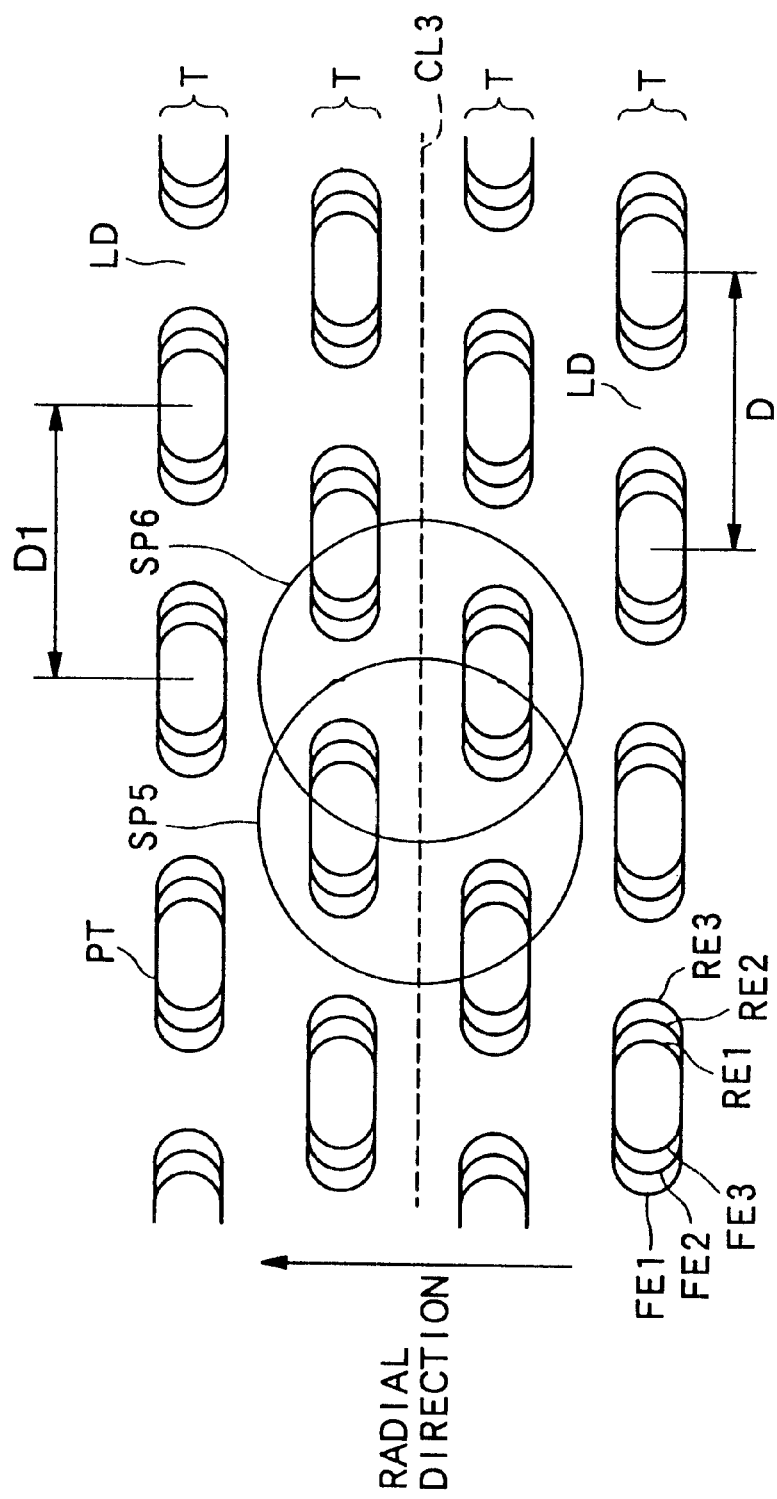
FIG. 2 is an enlarged view showing a configuration of an optical disk according to the first embodiment.

FIG. 1 is a plan view showing a pit arrangement of an optical disk according to the first embodiment, and FIG. 2 is a partially enlarged view of the pit arrangement. In FIGS. 1 and 2, the positions that the front and rear edges of each pit can take are designated by solid lines in order to indicate that the positions of the front and rear edges of each pit are changed in three steps in accordance with the recording symbols. Nevertheless, the actual position of an edge is of course one of the three positions.

As shown in FIG. 1, the optical disk DK1 according to the first embodiment includes a data area DA with digital data recorded therein, alternating with a sample servo area SA having each pit providing a reference of sample servo. The beam spot SP of the reproduction laser beam moves on the center line CL3 between two tracks T.

The digital data are recorded in the data area DA using the SCIPER system. Namely, the pits PT with the front edge and the rear edge thereof changing in accordance with the recording symbol corresponding to the digital data are recorded in the data area DA. The recording symbol has one of the ternary levels "−1", "0", "+1".

The sample servo area SA, on the other hand, is formed with pits providing a reference of sample servo. These pits form a predetermined pit pattern over a plurality of tracks T. Among these pits, the sync pits Psync constitute a reference for synchronization at the time of reproduction and are aligned radially of the optical disk DK1 and are longer than the other pits. The tracking pits Ptrk, on the other hand, constitute a reference for tracking servo control at the time of reproduction, and are formed at different positions along the circumferential direction of the optical disk DK1 in periods of three tracks. Further, the clock pits Pclk are a reference for detecting the reproduction clocks from the optical disk DK1 at the time of reproduction and are aligned radially of the optical disk DK1.

Next, the arrangement of the pits PT in the data area DA of the optical disk DK1 will be explained in detail.

As shown in FIG. 2, the pits PT are arranged at predetermined intervals D1 on each track T in the data area DA. The front edge and the rear edge of each pit PT change in three steps along the circumferential direction of the optical disk DK1 in accordance with the recording symbol having one of the ternary values "−1", "0", "+1".

When the recording symbol is "−1", for example, the front edge takes a position indicated by reference numeral FE3 and thereby the length of the pit PT is shortened. When the recording symbol is "0", on the other hand, the front edge takes a position indicated by reference numeral FE2, which is an intermediate position of the three positions. When the recording symbols is "+1", the front edge takes a position indicated by reference numeral FE1 and thereby the length of the pit PT is lengthened.

In similar fashion, when the recording symbol is "−1", the rear edge takes a position indicated by reference numeral RE1 and thereby the length of the pit PT is shortened. When the recording symbol is "0", the rear edge takes a position indicated by reference numeral RE2, which is an intermediate position of the three positions. When the recording symbol is "+1", the rear edge takes a position indicated by reference numeral RE3 and thereby the length of the pit PT is lengthened.

When reproducing the digital data from the optical disk DK1, the reproduction apparatus radiates the reproduction laser beam on the pits PT formed on adjacent tracks T. In this process, the range of the beam spot contains four edges as shown in FIG. 2. The beam spot moves relatively with the optical disk along the circumferential direction of the optical disk so that the center thereof comes to coincide with the center line CL3. As a result, the analog detection signal corresponding to each recording symbol is detected.

Further, in the optical disk DK1 according to the first embodiment, the pit trains are 180 degree out of phase between adjacent tracks T. That is, the phase of the pit train on a certain track and the phase of the pit train on the adjacent track are shifted each other by half of the predetermined interval D1, as shown in FIG. 2. For example, the position of the pit train aligned above the center line CL3 and the position of the pit train aligned under the center line CL3 are displaced along the circumferential direction by D1/2. The circumferential positions of the pits PT aligned above the center line CL3 are coincident with the intermediate positions (the positions of the lands LD) of the adjacent two pits PT aligned in the circumferential direction under the center line CL3.

(B) Information recording apparatus

Figure 3A:
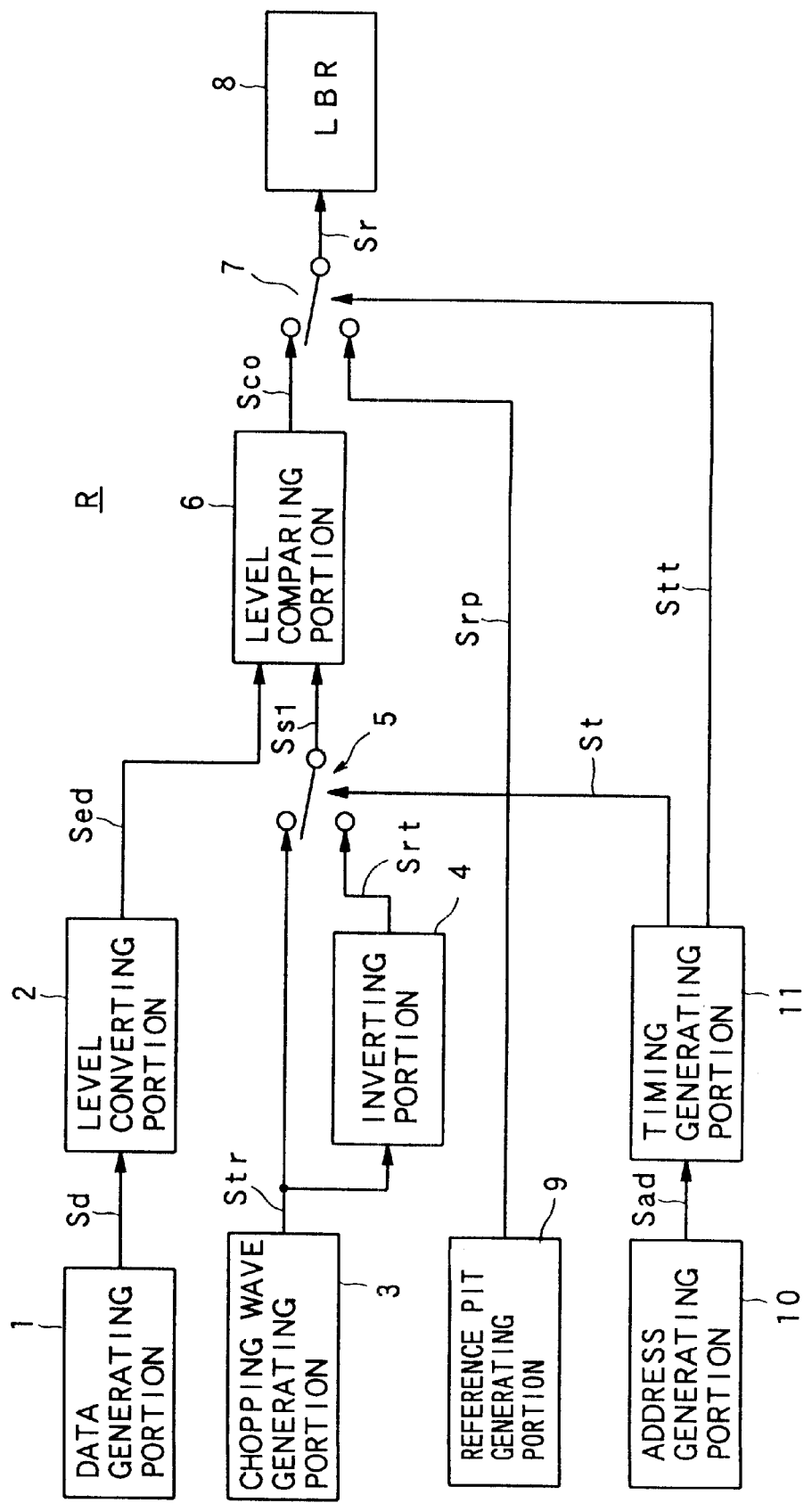
FIG. 3A is a block diagram showing a configuration of an information recording apparatus according to the first embodiment.

Next, an information recording apparatus for recording digital data in the optical disk DK1 according to an embodiment will be explained with reference to FIG. 3A. FIG. 3A is a block diagram showing a configuration of an information recording apparatus according to the first embodiment.

The information recording apparatus shown in FIG. 3A is used as what is called the mastering apparatus for fabricating the master disk of the optical disk DK1 shown in FIGS. 1 and 2.

As shown in FIG. 3A, the information recording apparatus according to the first embodiment comprises a data generating portion 1, a level converting portion 2, a chopping wave generating portion 3, an inverting portion 4, switches 5, 7, a level comparing portion 6, a LBR (laser beam recorder) 8, a reference pit generating portion 9, an address generating portion 10 and a timing generating portion 11.

Next, the operation will be explained.

The data generating portion 1 is for segmenting the digital data into sets of three bits, and each recording data thus segmented is converted into two recording data having one of the ternary values "−1", "0", "+1". This recording data corresponds to the recording symbol described above. A conversion table as shown in FIG. 3B is used for this conversion. The 3-bit recording data take 8 ($=2^3$) values while two recording symbols take 9 ($=3^2$) values. Thus, the 3-bit recording data can be converted into the two recording symbols in one-to-one relation. This conversion method is only an example, and other methods can also be employed for one-to-one conversion. The data generating portion 1 outputs the generated recording symbols to the level converting portion 2 as a data signal Sd.

The level converting portion 2 converts the level of the data signal Sd to suit the threshold voltage, and outputs the converted signal to one of the terminals of the level comparing portion 6 as a conversion data signal Sed. For example, the level converting portion 2 converts the levels of "−1", "0" and "+1" to the voltages of +1 V, 0 V and −1 V, respectively.

The voltage of the conversion data signal Sed (the threshold voltage) changes at a timing coincident with a bottom timing or a top timing of the chopping wave signal Str. The bottom timing is indicative of a timing when the level of the chopping wave signal Str turns from decrease to increase. The top timing, in contrast, is indicative of the timing at which the level of the chopping wave signal Str changes from increase to decrease. Namely, the threshold voltage changes in accordance with a corresponding recording symbol at each of the bottom timing and the top timing of the chopping wave signal Str.

In parallel with this operation, the chopping wave generating portion 3 generates a chopping wave having a period equal to the period D1 of the pit PT, and outputs the resulting chopping wave signal Str to the inverting potion 4 and one of the terminals of the switch 5. The chopping wave signal Str represents a chopping wave having an amplitude ±2V.

The inverting portion 4 inverts the polarity of the chopping wave signal Str, generates the inverted chopping wave signal Srt having an opposite phase to the original chopping wave signal Str, and outputs the resulting signal to the other terminal of the switch 5.

The switch 5 selects the chopping wave signal Str or the inverted chopping wave signal Srt 180 degrees out of phase with each other based on the track alternating signal St supplied from the timing generating portion 11, and outputs the selected chopping wave signal to the other terminal of the level comparing portion 6 as a switch signal Ss1.

The level comparing portion 6 compares the voltage of the switch signal Ss1 with the voltage (threshold voltage) of the conversion data signal Sed. The level comparing portion 6 further generates a data pit pulse Sco which takes a "HIGH" level when the voltage of the switch signal Ss1 is higher than the threshold voltage and takes a "LOW" level when the voltage of the switch signal Ss1 is lower than the threshold voltage. The signal thus generated is output to one of the terminals of the switch 7.

Figure 3C:
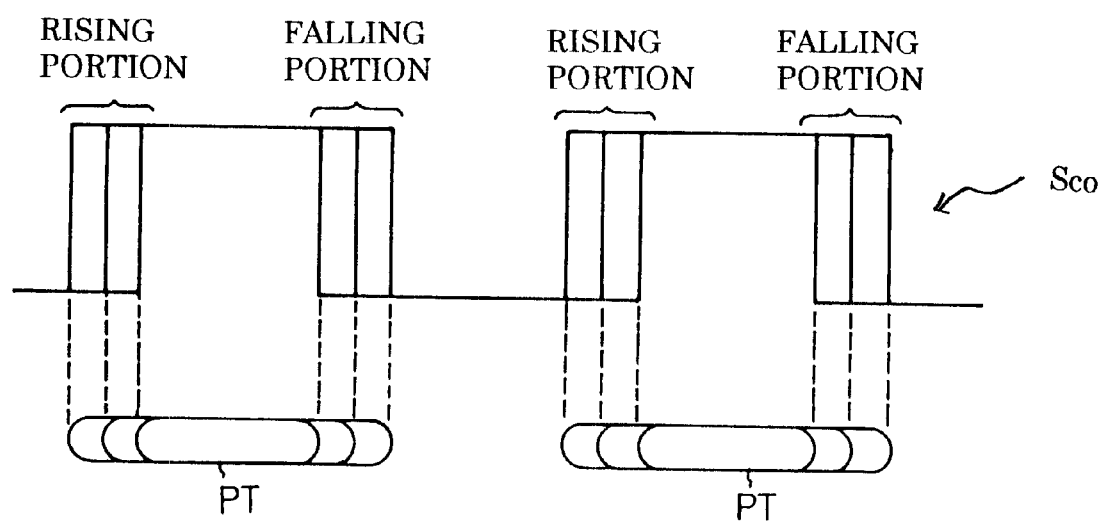
FIG. 3C is a diagram showing data pit pulses and corresponding pits.

An example of the data pit pulse Sco is shown in FIG. 3C. In FIG. 3C, all the three rise timings or fall timings contained in the rising portion or the falling portion corresponding to the pit edge are indicated by solid line. However, an actual data pit pulse Sco is formed at only one of the three rise timings or the three fall timings.

The reference pit generating portion 9, on the other hand, generates a reference pit pulse Srp corresponding to each pit recorded in the sample servo area SA and outputs the same pulse to the other terminal of the switch 7.

The switch 7 selects the data pit pulse Sco to be recorded in the data area DA or the reference pit pulse Srp to be recorded in the sample servo area SA based on the area select signal Stt supplied from the timing generating portion 11, and outputs the selected signal to the LBR 8 as a recording pulse Sr.

The LBR 8 turns on/off the recording laser beam radiated on the master disk based on the recording pulse Sr, and forms each pit including the pit PT shown in FIG. 1 on the master disk. More specifically, when the recording pulse Sr is at "HIGH" level, the recording laser beam is turned on and each pit is formed on the master disk.

In parallel to these operations, the address generating portion generates an address signal Sad indicating the present recording position on the master disk surface and outputs the address signal Sad to the timing generating portion 11.

Based on the address signal Sad, the timing generating portion 11 generates the track alternating signal St inverted in polarity for each track and an area select signal Stt with the polarity thereof inverted depending on whether the sample servo area SA or the data area DA is involved. The track alternating signal St is output to the switch 5, and the area select signal Stt is output to the switch 7.

As the result of the operation described above, in the case where the recording data contained in the conversion data signal Sed is "−1", the switch signal Ss1 having an amplitude of ±2 V is compared with the threshold voltage of +1 V. Thus, the duration of "HIGH" level of the data pit pulse Sco is shortened, with the result that the length of the pit PT (the length along the circumferential direction of the optical disk DK1) is also shortened. In the case where the recording data is "0", on the other hand, the switch signal Ss1 is compared with the threshold voltage of 0 V, and therefore the duty cycle of the data pit pulse Sco is 50%. Further, in the case where the recording data is "+1", the switch signal Ss1 is compared with the threshold voltage of −1 V, and therefore the duration of "HIGH" level of the data pit pulse Sco is lengthened. In this way, it is possible to fabricate a master disk containing a pit PT of which the pit edge position changes in accordance with the recording data.

(C) Information reproduction apparatus

Figure 4:
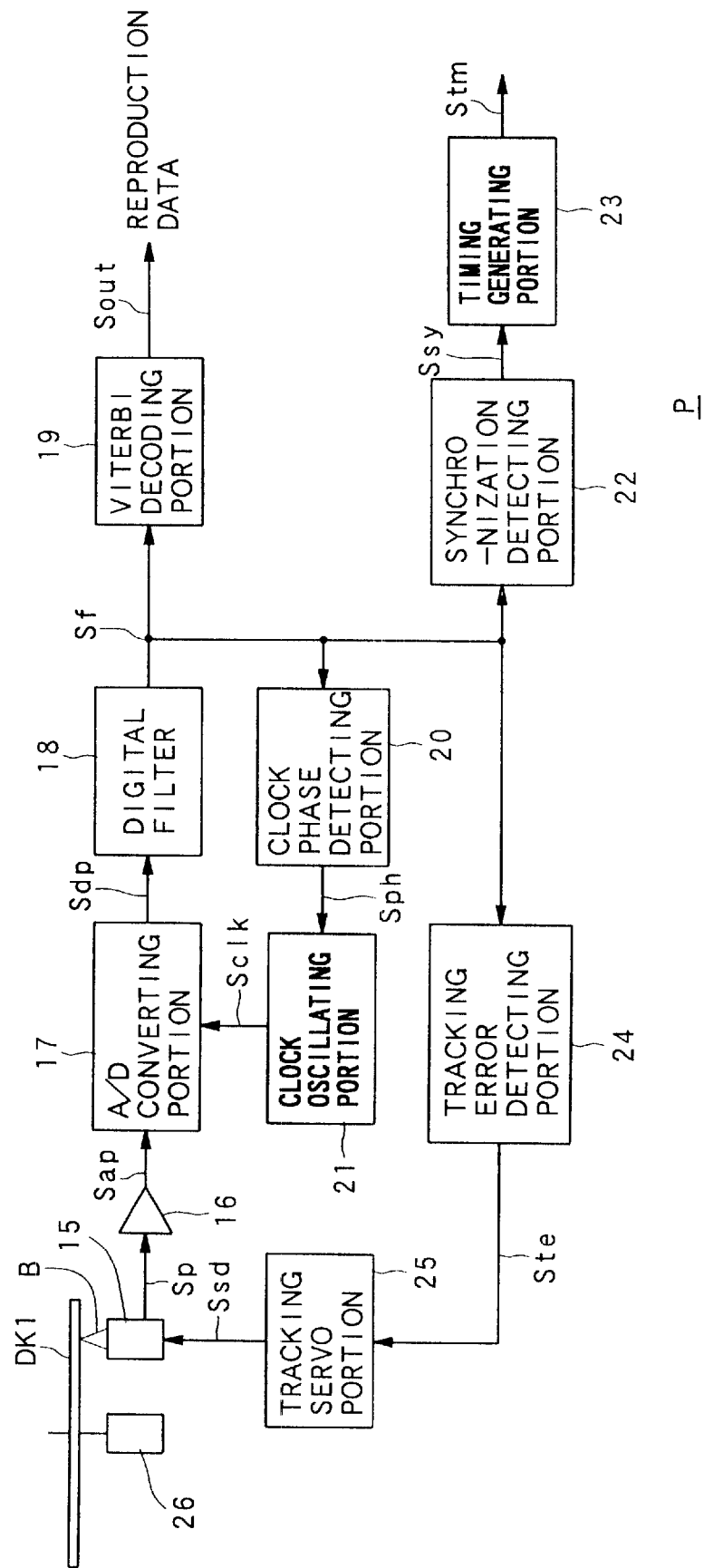
FIG. 4 is a block diagram showing a configuration of an information reproduction apparatus according to the first embodiment.
Figure 5:
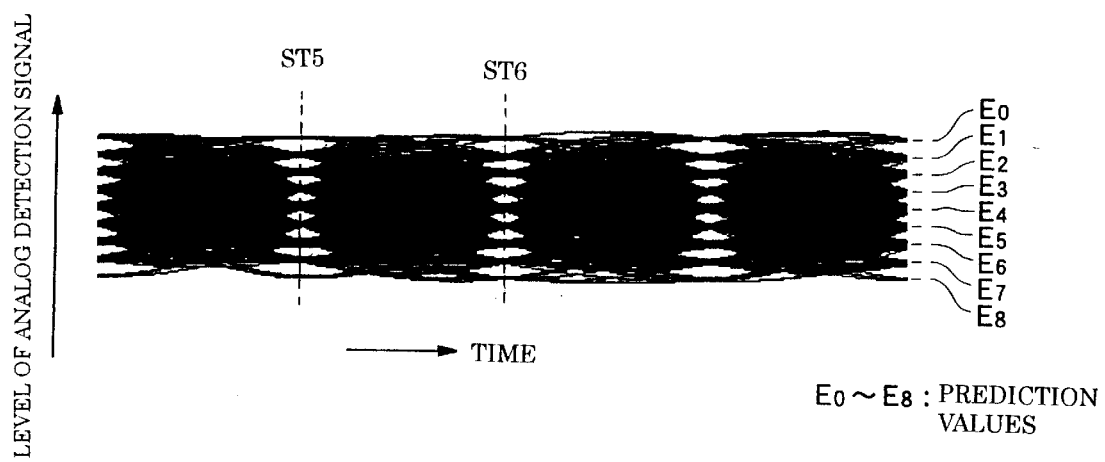
FIG. 5 is a diagram showing waveforms of analog detection signals according to the first embodiment.

Next, an information reproduction apparatus for reproducing the digital data by the two-dimensional PRML system from the optical disk DK1 having the digital data recorded therein will be explained with reference to FIGS. 4 and 5. FIG. 4 is a block diagram showing a configuration of the information reproduction apparatus according to the first embodiment, and FIG. 5 is a diagram showing waveforms of the analog detection signals in the information reproduction apparatus. In FIG. 5, a multiplicity of signals that can be output as an analog detection signal are shown overlapped. However, only one of the waveforms shown in FIG. 5 is output as an analog detection signal.

As shown in FIG. 4, the information reproduction apparatus P according to the first embodiment comprises a pickup 15, an amplifier 16, an A/D converting portion 17, a digital filter 18, a Viterbi decoding portion 19, a clock phase detecting portion 20, a clock oscillating portion 21, a synchronization detecting portion 22, a timing generating portion 23, a tracking error detecting portion 24, a tracking servo portion 25 and a spindle motor 26.

Next, the operation will be explained.

The pickup 15 radiates a reproduction laser beam B on the optical disk DK1, receives and converts the reflected light into electricity, generates an analog detection signal Sp and outputs it to the amplifier 16.

The amplifier 16 amplifies the analog detection signal Sp with a predetermined amplification degree, and thus generating an amplified detection signal Sap, and then outputs it to the A/D converting portion 17.

The A/D converting portion 17 samples and converts the amplified detection signal Sap in synchronism with the reproduction clock Sclk, and generating a sample value series Sdp, and then outputs it to the digital filter 18.

The digital filter 18 multiplies the sample value series Sdp by a predetermined frequency characteristic, and by thus shaping the waveform, generates a shaped sample value series Sf, and outputs it to the Viterbi decoding portion 19, the clock phase detecting portion 20, the synchronization detecting portion 22 and the tracking error detecting portion 24.

The clock phase detecting portion 20 extracts a reproduction signal corresponding to the clock pit Pclk (refer to FIG. 1) from the shaped sample value series Sf, and detects the phase error based on the reproduction signal. Based on this detection, the clock phase detecting portion 20 generates a phase error signal Sph and outputs it to the clock generating portion 21.

The clock generating portion 21 changes the frequency of the reproduction clock Sclk based on the phase error signal Sph, generates the reproduction clock Sclk in phase with the analog detection signal Sp, and outputs it to the A/D converting portion 17.

On the other hand, the tracking error detecting portion 24 extracts the reproduction signal corresponding to the tracking pit Ptrk (refer to FIG. 1) from the shaped sample value series Sf. Based on this reproduction signal, the tracking error detecting portion 24 calculates the tracking error of the reproduction laser beam B, generates the tracking error signal Ste, and outputs it to the tracking servo portion 25.

The tracking servo portion 25, based on the tracking error signal Ste, generates a control signal Ssd for controlling the radial position of an objective lens not shown in the pickup 15, and outputs it to an actuator not shown in the pickup 15. As a result, the tracking servo control operation is performed.

In parallel to this, the synchronization detecting portion 22 extracts the reproduction signal corresponding to the synchronization pit Psync (refer to FIG. 1) from the shaped sample value series Sf, generates a synchronization detection signal Ssy, and outputs it to the timing generating portion 23.

The timing generating portion 23 generates various timing signals Stm required for various component parts using the synchronization detection signal Ssy as a time reference, and supplies the signals Stm to the component parts.

Further, the Viterbi decoding portion 19 calculates the square error between the input shaped sampled value series Sf and nine prediction values (indicated by E0 to E8 in FIG. 5), respectively. The Viterbi decoding portion 19 decodes the reproduction data series Sout in such a manner as to minimize the calculated square error and outputs it to external parts.

Next, the analog detection signal Sp output from the pickup 15 in the configuration described above will be explained with reference to FIGS. 2 and 5.

ST5 and ST6 in FIG. 5 indicate the time points when the beam spot comes to the positions SP5 and SP6 in FIG. 2 respectively. At these time points, the A/D converting portion 17 of the information reproduction apparatus samples the levels of the analog detection signal.

Namely, as shown in FIG. 2, the A/D converting portion 17 performs the sampling operation on two adjacent tracks, each time the front and rear edges of one pit PT formed on the track located above the center line CL3, the rear edge of one of the two pits PT formed on the track located under the center line CL3 and the front edge of the other pit PT formed on the track located under the center line CL3 come into the range of the beam spot. Further, the A/D converting portion 17 performs the sampling operation on two adjacent tracks, each time the front and rear edges of one pit PT formed on the track located under the center line CL3, the rear edge of one of the two pits PT formed on the track located above the center line CL3 and the front edge of the other pit PT formed on the track located above the center line CL3 come into the range of the beam spot.

According to this embodiment, a total of four edges of the pits formed on two tracks T are detected at the same time, and each edge of the pits changes its position in accordance with the recording symbol having one of the ternary levels "-1", "0", "+1". As a result, the sample value series Sdp corresponding to the analog detection signal Sp indicates one of the sums of four data (recording symbols). In other words, the sample value series Sdp indicates one of a total of the nine levels "-4" to "+4".

The level of this sample value series Sdp (shaped sample value series Sf) having the novenary level is determined using the nine prediction values E0 to E8 in the Viterbi decoding portion 19. As a result, the digital data recorded in the optical disk DK1 can be decoded.

As shown in FIG. 5, the central level of the analog detection signal Sp is always constant regardless of the sample timing. This is because the pit trains are opposite in phase between the adjacent tracks T of the optical disk DK1.

Namely, the area of the pits PT included in the beam spot SP5 or SP6 in each sample timing is substantially constant, and therefore the amount of light reflected from the optical disk DK1 is also constant. As a result, the central level of the analog detection signal Sp is constant, thereby reducing the nonlinear distortion of the analog detection signal Sp. Further, since the central level of the analog detection signal Sp is constant regardless of the sample timing, only one set of the nine prediction values is sufficient for use in the Viterbi decoding process in the Viterbi decoding portion 19.

As explained above, according to this embodiment, the phase of the pit trains on the optical disk DK1 is opposite between the adjacent tracks T. Therefore, the central level of the analog detection signal Sp obtained by simultaneous optical detection of a plurality of adjacent tracks T can be rendered substantially constant. As a result, the configuration of the information reproduction apparatus P can be simplified, while at the same time preventing the deterioration of the reproduction performance.

Also, since digital data are recorded by changing each edge position of each pit PT along the circumferential direction of the optical disk DK1 in proportion to the digital data to be recorded, the digital data can be reproduced more accurately and more simply.

Further, since the digital data are recorded by changing edge position of each pit PT in three steps, the ternary digital data can be recorded with high density and can be reproduced accurately and simply.

Furthermore, since the sample servo area SA is provided separately from the digital data, the digital data can be recorded with high density in the data area DA.

(II) Second Embodiment

Next, a second embodiment of the invention will be explained with reference to FIGS. 6A and 6B.

In the second embodiment, the invention is applied to the recording/reproduction operation by a combination of the SCIPER system and the RPR reproduction system.

Figure 6A:
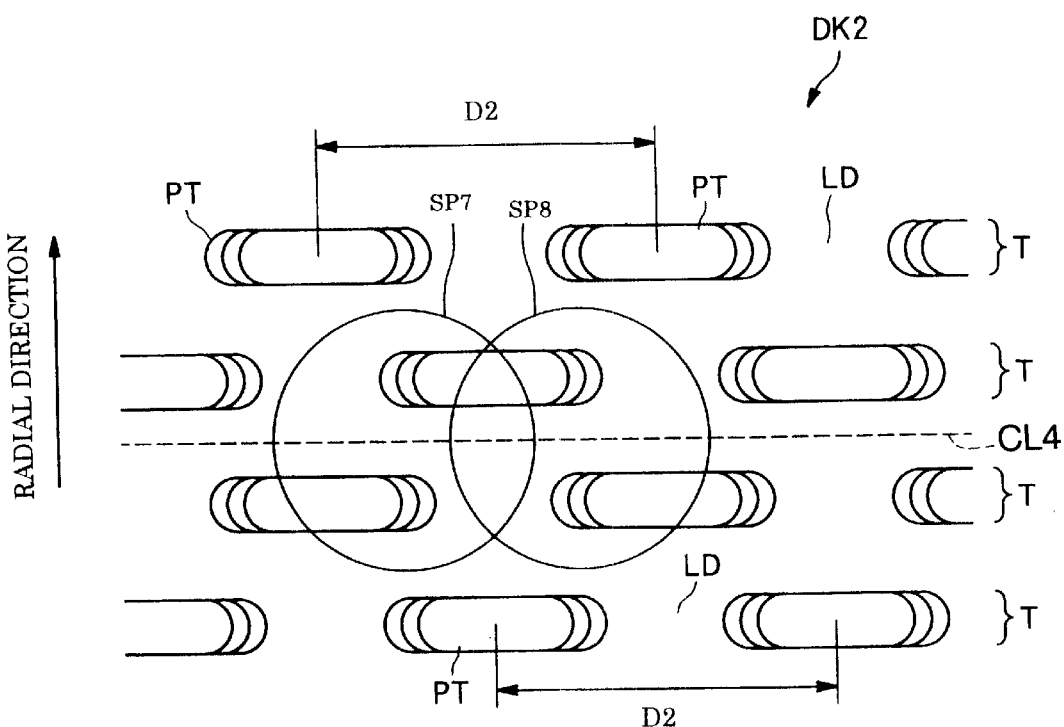
FIG. 6A is an enlarged view showing a configuration of an optical disk according to a second embodiment.
Figure 6B:
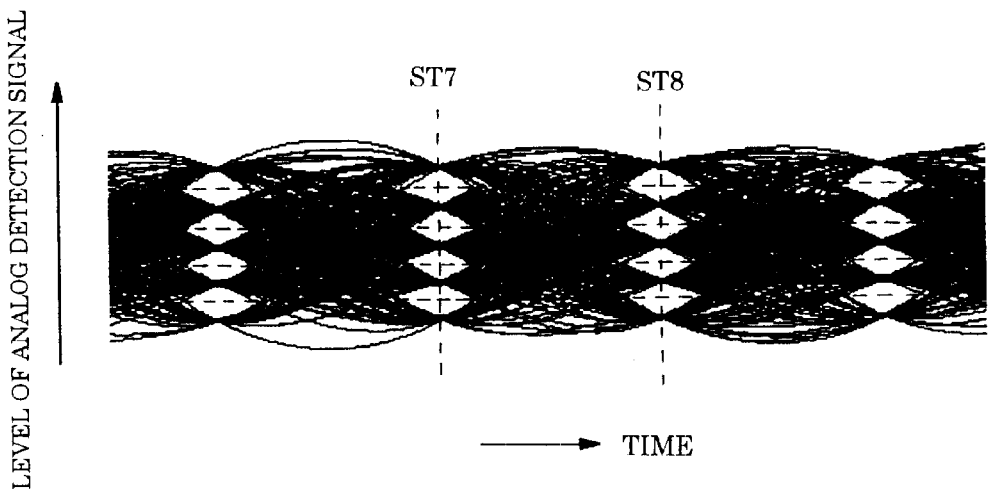
FIG. 6B is a diagram showing waveforms of analog detection signals according to the second embodiment.
Figure 7:
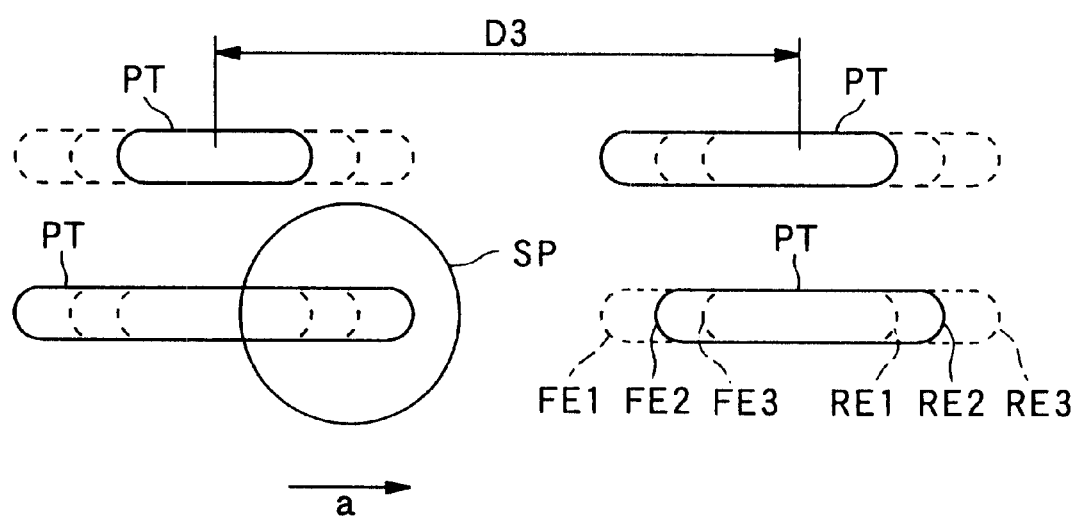
FIG. 7 is a diagram for explaining the principle of the SCIPER system.
Figure 8:
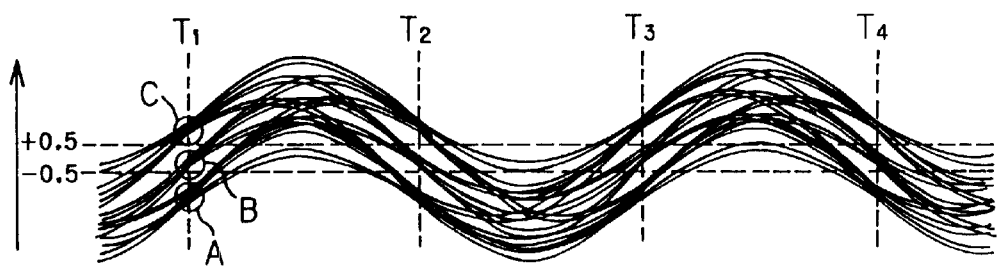
FIG. 8 is a waveform diagram of a corresponding analog detection signals.
Figure 9A:
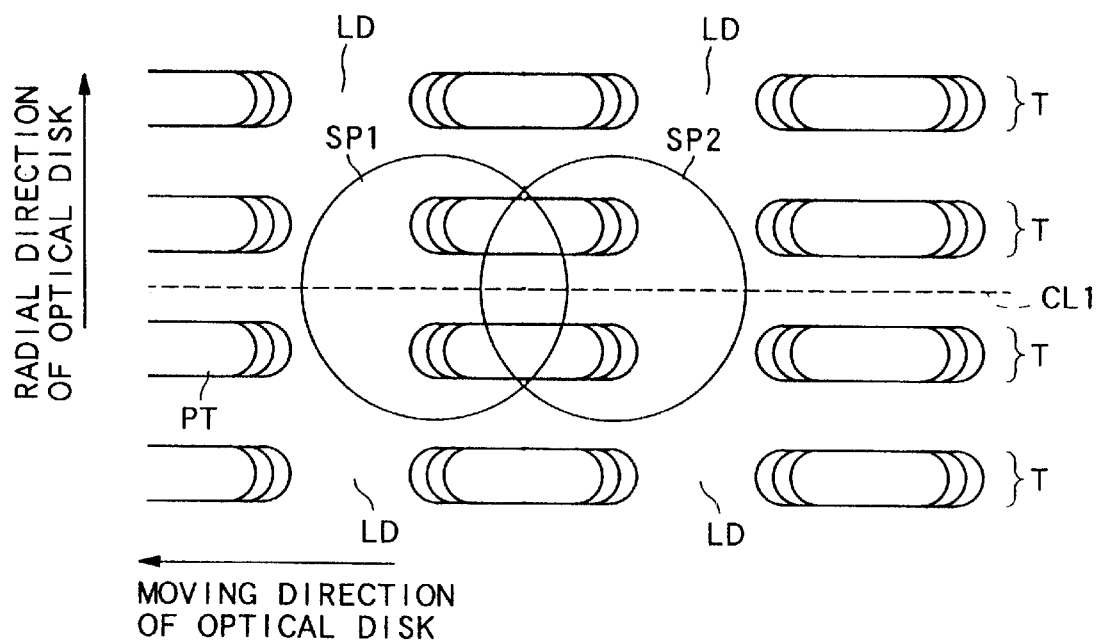
FIG. 9A is a plan view showing a pit arrangement of the optical disk using the conventional recording and reproduction technique combining the SCIPER system and the RPR reproduction system.
Figure 9B:
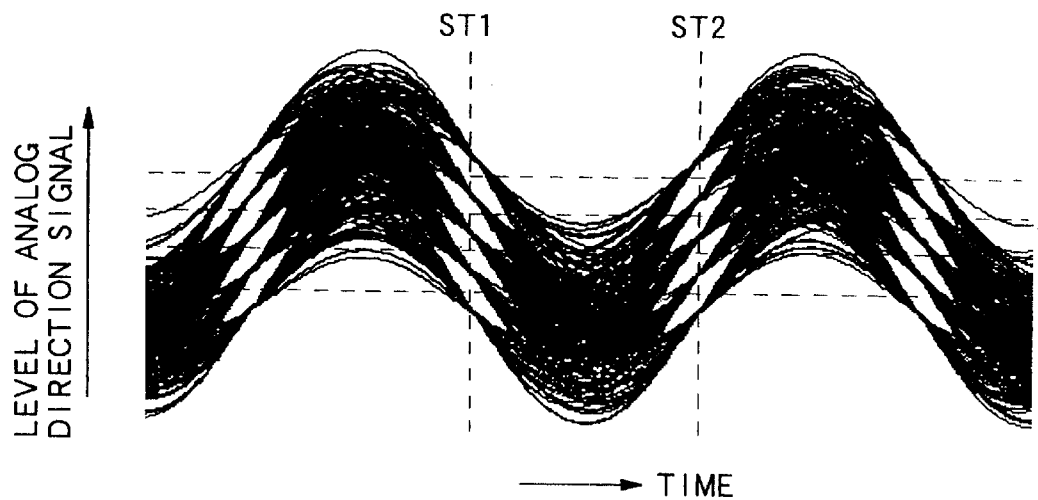
FIG. 9B is a diagram showing waveforms of the analog detection signals in the conventional recording and reproduction technique combining the SCIPER system and the RPR reproduction system.
Figure 10A:
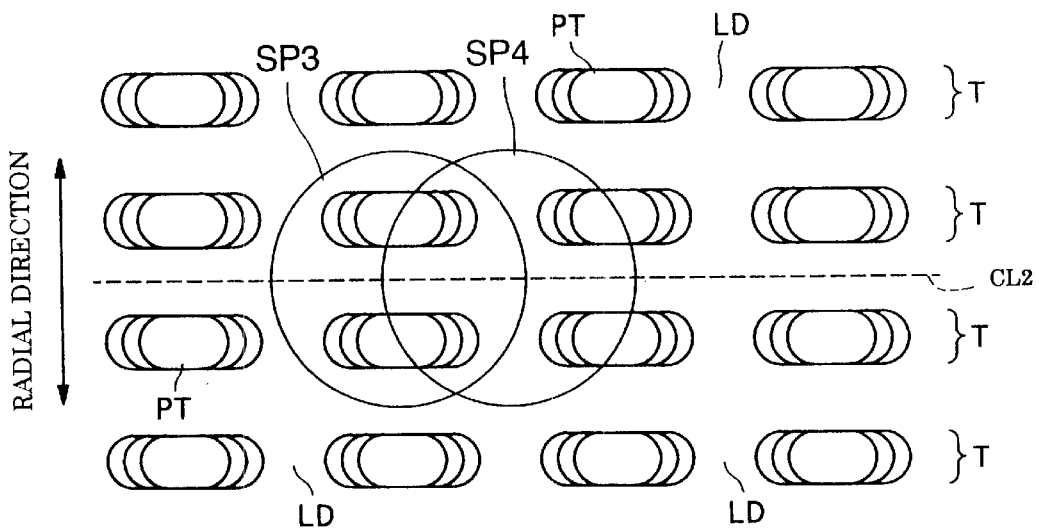
FIG. 10A is a plan view showing the pit arrangement of the optical disk in the conventional recording and reproduction technique combining the SCIPER system and the two-dimensional PRML system.
Figure 10B:
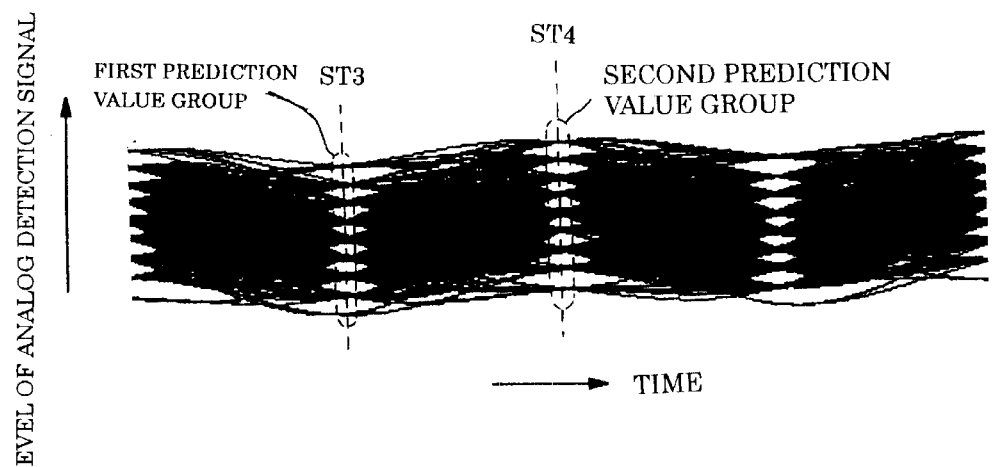
FIG. 10B is a diagram showing waveforms of the analog detection signals in the conventional recording and reproduction technique combining the SCIPER system and the two-dimensional PRML system.

FIG. 6A is a plan view showing the pit arrangement in the data area of an optical disk according to the second embodiment, and FIG. 6B is a diagram showing waveforms of the analog detection signals corresponding to the digital data. In FIG. 6B, a multiplicity of signals capable of being output as analog detection signals are shown overlapped. However, only one of the waveforms shown in FIG. 6B is output as the analog detection signal. Also, the description below refers to the case in which the positions of the front and rear edges of each pit correspond to the recording symbols having any one of the ternary levels "−1", "0", "+1" as in the first embodiment.

The configuration and operation of the information recording apparatus and the information reproduction apparatus according to the second embodiment are identical to those of the information recording apparatus and the information reproduction apparatus, respectively, according to the first embodiment, except that the information reproduction apparatus according to the second embodiment employs the RPR reproduction system. Therefore, in the second embodiment, an explanation will be given only about the configuration of the optical disk and the corresponding analog detection signal constituting the feature of the second embodiment.

First, the optical disk (read-only optical disk) making up a recording medium according to the second embodiment will be explained with reference to FIG. 6A. In FIG. 6A, the solid lines indicate all the positions that the front and rear edges of each pit can take for recording the digital data. However, only one of these edges makes up the front or rear edge of each pit.

As shown in FIG. 6A, in the optical disk DK2 according to the second embodiment, the beam spot SP of the reproduction laser beam B moves along the center line CL4 between the two tracks as indicated by dashed line in FIG. 6A.

As shown in FIG. 6A, the pits PT are arranged at a predetermined interval D2 on each track T in the data area. The positions of the front and rear edges of each pit PT change in three steps along the circumferential direction of the optical disk DK2 in accordance with the recording symbol having one of the ternary levels of "−1", "0", "+1". The positions of the front and rear edges are changed in the same manner as in the first embodiment.

When reproducing the digital data from the optical disk DK2, the reproduction laser beam is radiated on the pits PT formed on the adjacent tracks T of the optical disk. In this process, the range of the beam spot includes the two edges as shown in FIG. 6A. The beam spot moves relative to the optical disk along the circumferential direction of the optical disk so that the center of the beam spot coincides with the center line CL4. As a result, the analog detection signal corresponding to each recording symbol is detected.

Further, with the optical disk DK2, the pit trains are 180 degrees out of phase between adjacent tracks T, like in the first embodiment.

ST7 and ST8 in FIG. 6B indicate the time points when the beam spot comes to the positions SP7 and SP8 in FIG. 6A respectively. At these time points, the A/D converting portion of the information reproduction apparatus samples the levels of the analog detection signal.

In the case of FIGS. 6A and 6B, the pits PT formed on the two tracks T are detected at the same time, and each edge of the pits changes its position in accordance with the recording symbol having the ternary levels of "−1", "0", "+1". As a result, the sample value of the analog detection signal Sp indicates one of the sums of two recording symbols. Namely, the sample value of the analog detection signal Sp represents one of the five levels "−2", "−1", "0", "+1", "+2". By determining these quinary levels of the sample values, the digital data recorded in the optical disk DK2 can be decoded.

In this process, as shown in FIG. 6B, the level of the analog detection signal Sp is flat overall regardless of the sample timing. This is because the phase of the pit trains is opposite between adjacent tracks of the optical disk DK2.

Namely, the area of the pit PT included in the beam spot SP is substantially constant before and after each sample timing, and so is the amount of light reflected from the optical disk DK2. As a result, the analog detection signal Sp is flat regardless of the sample timing.

As described above, the central level of the analog detection signal Sp is always substantially constant also in the second embodiment, and therefore the digital data can be reproduced by the RPR reproduction system without deteriorating the reproduction performance.

(III) Modifications

In addition to the two embodiments described above, the present invention can be variously modified.

Namely, the number of edges of the pits irradiated with the reproduction laser beam B at the same time at each sample timing may be three on one radius of three tracks or six on three radii of two tracks, instead of two on one radius of two tracks for the RPR reproduction system or four on two radii of two tracks for the two-dimensional PRML reproduction system.

Also, the invention is applicable to the SCIPER system for recording the binary digital data or quarternary or other digital data as well as to the SCIPER system for recording the ternary digital data.

Further, the invention is applicable to the case in which the digital data are decoded by a system other than the Viterbi decoding system. The maximum likelihood decoding of digital data using what is called the FDTS (Fixed Delay Tree Search) or the decoding of digital data using the threshold determination is an example.

Furthermore, the invention is applicable to a rewritable optical disk such as a magneto-optical disk or a phase change disk as well as to the read-only optical disk for recording digital data with embossed pits. More specifically, the invention is applicable to a configuration in which micropits are recorded by micronizing the beam spot of the recording laser beam using a super-resolution film and the micropits on a plurality of tracks are read at the same time by the reproduction laser beam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 11-007891 filed on Jan. 14, 1999 including the specification, claims, drawings and summary is incorporated herein by reference in its entirety.

What is claimed is:

1. A recording medium for recording digital information comprising:

a substrate member;

a plurality of recording tracks formed on the substrate member; and a plurality of pits formed on the recording tracks, wherein the pits are arranged in a fixed period, a position of an edge of each of the pits is changed in accordance with the digital information to be recorded in the recording medium, and a phase of a train of the pits formed on one of the recording tracks is shifted by 180 degrees from a phase of a train of the pits formed on another one of the recording tracks adjacent to the one of the recording tracks so that a central level of an analog detection signal detecting pit positions is constant.

2. The recording medium according to claim 1, wherein the substrate member is a disk, the recording tracks are extended in a circumferential direction of the disk, and the position of the edge of each of the pits is changed in the circumferential direction of the disk.

3. The recording medium according to claim 1, wherein the position of the edge of each of the pits is changed in three steps in accordance with the digital information.

4. The recording medium according to claim 1, a digital information recording area and a control information recording area are formed on the substance member, the pits corresponding to the digital information are recorded in the digital information recording area, a plurality of control pits corresponding to control information are recorded in the control information recording area, and the control information is information for a detection of the position of the edge of each of the pits corresponding to the digital information.

5. An apparatus for reproducing digital information recorded in a recording medium, the recording medium comprising: a substrate member; a plurality of recording tracks formed on the substrate member; and a plurality of pits formed on the recording tracks, the pits being arranged in a fixed period, a position of an edge of each of the pits being changed in accordance with the digital information, a phase of a train of the pits formed on one of the recording tracks being shifted by 180 degrees from a phase of a train of the pits formed on another one of the recording tracks adjacent to the one of the recording tracks so that a central level of an analog detection signal detecting pit positions is constant, the apparatus comprising:

a detecting device that simultaneously irradiates at least two of the recording tracks adjacent to each other with a light beam, simultaneously detects the positions of the front or rear edges of at least two of the pits formed on the at least two of the recording tracks, based on the light beam reflected by the at least two of the recording tracks, and generates the detection signal indicating the detected positions of the front or rear edges; and a reproducing device that reproduces digital information, based on the detection signal.

6. The apparatus according to claim 5, wherein the reproducing device comprises a Viterbi decoding device that decodes the detection signal in accordance with a Viterbi decoding method.

7. An apparatus for recording digital information in a recording medium, the recording medium comprising a substrate member; and a plurality of recording tracks formed on the substrate member, the apparatus comprising:

a first generating device that generates a first pulse signal having a fixed period, whose rising timing and falling timing are changed in accordance with the digital information;

a second generating device that generates a second pulse signal having the fixed period, whose rising timing and falling timing are changed in accordance with the digital information, and whose phase is shifted by 180 degrees from a phase of the first pulse signal; and a pit forming device that forms a plurality of pits on the recording tracks by using the first pulse signal and the second pulse signal, thereby recording the digital information on the recording tracks as the pits, wherein the pit forming device forms a first part of the pits on one of the recording tracks such that positions of edges of each of the pits in the first part are changed in accordance with the rising timing and the falling timing of the first pulse signal, and the pit forming device forms a second part of the pits on another one of the recording tracks adjacent to the one of the recording tracks such that positions of edges of each of the pits in the second part are changed in accordance with the rising timing and the falling timing of the second pulse signal so that a central level of an analog detection signal detecting pit positions is constant.

8. The apparatus according to claim 7, wherein the substrate member of the recording medium is a disk, the recording tracks are extended in a circumferential direction of the disk, and the pit forming device forms the pits such that the positions of the edges of each of the pits are changed in the circumferential direction of the disk.

9. The apparatus according to claim 7, wherein the pit forming device forms the pits such that the positions of the edges of each of the pits are changed in three steps in accordance with the digital information.

* * * * *